US012325013B2

(12) United States Patent
Zhang et al.

(10) Patent No.: US 12,325,013 B2
(45) Date of Patent: Jun. 10, 2025

(54) ONE-STEP METHOD FOR PREPARING MAGNETIC MAGNESIUM-IRON LAYERED DOUBLE HYDROXIDE (LDH)-BIOCHAR COMPOSITE MATERIAL AND USE THEREOF

(71) Applicants: ZHEJIANG UNIVERSITY OF SCIENCE AND TECHNOLOGY, Zhejiang (CN); POWER CHINA HUADONG ENGINEERING CORPORATION LIMITED, Zhejiang (CN)

(72) Inventors: Jin Zhang, Zhejiang (CN); Haohao Bian, Zhejiang (CN); Wanpeng Liu, Zhejiang (CN); Cheng Shen, Zhejiang (CN); Shengdao Shan, Zhejiang (CN)

(73) Assignees: ZHEJIANG UNIVERSITY OF SCIENCE AND TECHNOLOGY, Zhejiang (CN); POWER CHINA HUADONG ENGINEERING CORPORATION LIMITED, Zhejiang (CN)

( * ) Notice: Subject to any disclaimer, the term of this patent is extended or adjusted under 35 U.S.C. 154(b) by 437 days.

(21) Appl. No.: 17/861,245

(22) Filed: Jul. 10, 2022

(65) Prior Publication Data
US 2023/0372892 A1    Nov. 23, 2023

(30) Foreign Application Priority Data
May 19, 2022    (CN) .......................... 202210543986.1

(51) Int. Cl.
*B01J 20/20*    (2006.01)
*B01J 20/04*    (2006.01)
(Continued)

(52) U.S. Cl.
CPC ............ *B01J 20/20* (2013.01); *B01J 20/041* (2013.01); *B01J 20/28009* (2013.01);
(Continued)

(58) Field of Classification Search
None
See application file for complete search history.

(56) References Cited

PUBLICATIONS

Yang et al., "Assembling biochar with various layered double hydroxides for enhancement of phosphorous recovery", Journal of Hazardous Materials, vol. 365, Mar. 5, 2019, pp. 665-673. (Year: 2019).*

(Continued)

*Primary Examiner* — Jonathan M Peo
(74) *Attorney, Agent, or Firm* — JCIPRNET

(57) ABSTRACT

A one-step method for preparing a magnetic magnesium-iron layered double hydroxide (LDH)-biochar composite material and use thereof provided. Biomass, as a substrate, is placed in a ferric salt solution, magnesium hydroxide is added, the materials are fully stirred and aged for a certain time, the aged materials are dried to obtain a magnesium-iron LDH-biomass, and the magnetic magnesium-iron LDH-biochar composite material is obtained after pyrolysis. The method solves problems of uncontrollable reaction and low crystallinity of products in preparing LDH using a coprecipitation method, reduces the amount of drugs, omits a step of adjusting a pH with an alkaline solution, improves yield and reduces a cost. The obtained magnetic magnesium-iron LDH-biochar composite material exhibits an excellent performance in adsorbing phosphate in water and can be recovered by an external magnetic field. Thus, an important method is provided for preparing LDH and the composite thereof.

7 Claims, 3 Drawing Sheets

(51) Int. Cl.
  B01J 20/28 (2006.01)
  B01J 20/30 (2006.01)
  C02F 1/28 (2023.01)
  C02F 101/10 (2006.01)
(52) U.S. Cl.
  CPC ....... *B01J 20/3021* (2013.01); *B01J 20/3078* (2013.01); *B01J 20/3085* (2013.01); *C02F 1/288* (2013.01); *C02F 1/281* (2013.01); *C02F 1/283* (2013.01); *C02F 1/286* (2013.01); *C02F 2101/105* (2013.01)

(56) References Cited

PUBLICATIONS

Xue et al., "High efficiency and selectivity of MgFe-LDH modified wheat-straw biochar in the removal of nitrate from aqueous solutions", Journal of the Taiwan Institute of Chemical Engineers, 63, 2016, 312-317. (Year: 2016).*

Da Silva et al., "Different routes for MgFe/LDH synthesis and application to remove pollutants of emerging concern", Separation and Purification Technology, 264, 2021, 118353, 11 total pages. (Year: 2021).*

Mahmoud et al., "Decorated Mn-ferrite nanoparticle@Zn—Al layered double hydroxide@Cellulose@ activated biochar nanocomposite for efficient remediation of methylene blue and mercury (II)", Bioresource Technology, 342, 2021, 126029. (Year: 2021).*

Ookubo et al., "Preparation and Phosphate Ion-Exchange Properties of a Hydrotalcite-like Compound", Langmuir, 1993, 9, pp. 1418-1422. (Year: 1993).*

Zhu et al., "Temperature-dependent magnesium citrate modified formation of MgO nanoparticles biochar composites with efficient phosphate removal", Chemosphere, vol. 274, Jul. 2021, 129904. (Year: 2021).*

Seon Yong Lee et al., "Adsorption and mechanistic study for phosphate removal by rice husk-derived biochar functionalized with Mg/Al-calcined layered double hydroxides via co-pyrolysis", Composites Part B, vol. 176, Issue 107209, Nov. 2019, pp. 1-15.

* cited by examiner

ONE-STEP METHOD FOR PREPARING MAGNETIC MAGNESIUM-IRON LAYERED DOUBLE HYDROXIDE (LDH)-BIOCHAR COMPOSITE MATERIAL AND USE THEREOF

CROSS-REFERENCE TO RELATED APPLICATION

This application claims the priority benefit of China application serial no. 202210543986.1, filed on May 19, 2022. The entirety of the above-mentioned patent application is hereby incorporated by reference herein and made a part of this specification.

BACKGROUND

Technical Field

The present disclosure belongs to the technical field of preparation of nano-structured functional materials and environmental materials, and specifically relates to a one-step method for preparing magnetic magnesium-iron layered double hydroxide (LDH)-biochar composite material and use thereof.

Description of Related Art

Phosphorus is an essential element for life. But if the phosphorus in phosphorus-containing wastewater is not treated well and the phosphorus enters an aquatic system, negative effects, such as eutrophication of the aquatic system, will be caused. Therefore, there is a great potential to develop an efficient and sustainable method to remove the phosphorus from the phosphorus-containing wastewater and recover it as a resource. Currently, biological treatment, membrane separation, chemical precipitation, electrolysis, adsorption, etc. have been studied. Among these technologies, adsorption is considered as a promising method due to its low cost, high selectivity, eco-friendliness and ease of operation.

Biochar has obvious advantages of consuming low production energy and reducing carbon emission in environmental application. In addition, a large amount of a low-cost waste is used as a raw material for producing the biochar, thus the biochar is an ideal sustainable adsorbent for water treatment. The surface of the biochar can be modified by chemical activation or a biochar-based composite material can be manufactured to further improve an adsorption capacity of the biochar. Hydrotalcite, layered double hydroxide (LDH), has gained a wide attention in many fields such as water treatment due to a strong ion exchange capacity. The LDH has a general form of $[M^{2+}_{1-x} M^{3+}_x(OH)_2] \cdot [A^{n-}_{x/n} \cdot mH_2O]$, wherein $M^{2+}$ and $M^{3+}$ are divalent and trivalent metal cations separately, x is a molar ratio of the trivalent metal cations, and $A^{n-}$ is an anion in an interlayer. A synergistic effect of the LDH and the biochar obviously improves physicochemical properties, such as a specific surface area, surface functional groups, structural heterogeneity, stability and adsorption characteristics, of a biochar/LDH composite material. Besides, due to sustainability, low cost and great potential of effectively removing various pollutants, more and more researchers pay attention to loading the LDH on the biochar to remove the pollutants.

At present, the LDH-biochar composite material is mainly prepared by three methods, namely hydrothermal synthesis, coprecipitation of an LDH salt on a surface of biochar and co-pyrolysis after coprecipitation of an LDH salt on a surface of a biomass. Since the coprecipitation is economic and high-yield, it is most commonly used for preparing the LDH-biochar composite material. However, the coprecipitation usually requires a long aging time and a relatively strict control of pH. Besides, a formation of a large number of crystallization nuclei also results in LDH particles with a low crystallinity. The low cost of the LDH-biochar composite material is relative, thus it is difficult to be really applied and popularized in the environmental protection industry with a low economic benefit.

In 2019, Lee, et al. added magnesium nitrate and aluminum nitrate into sodium hydroxide to adjust pH, magnesium-aluminum LDH was coprecipitated on a surface of rice hull powder, and magnesium-aluminum LDH-rice hull biochar composite material was synthesized by co-pyrolysis, specifically as follows: 1) 1 g of rice hull powder was put into 80 ml of a solution containing a certain concentration of magnesium nitrate hexahydrate and aluminum nitrate nonahydrate, and an obtained mixture was vibrated for one hour at a room temperature and at a rotating speed of 300 r/min; 2) during the vibration, sodium hydroxide with a concentration of 5 M was dripped in to keep a pH of the solution constant at 10.0; 3) an obtained mixture was aged at 50° C. for 72 h; 4) a sample was collected, washed with deionized water, and dried at 80° C. overnight; 5) the dried sample was put into a tubular quartz furnace for pyrolysis at a heating rate of 10° C./min within a temperature range (300-700° C.), and nitrogen was continuously introduced during the pyrolysis; 6) prepared biochar was collected and washed with deionized water; and 8) the washed material was dried at 80° C. In the technology, rice hulls were used as a biomass raw material, magnesium nitrate and aluminum nitrate were added, pH was adjusted by sodium hydroxide, magnesium aluminum hydrotalcite was preloaded on rice hull powder, and pyrolysis was carried out to prepare the magnesium-aluminum LDH-rice hull biochar composite adsorbing material. The preparation is complex, has a relatively high requirement on experiment operations, and requires a long aging time (72 h), the material after adsorption is difficult to recover, thus the technology is not suitable for practical application.

SUMMARY

Aiming at problems in the prior art, the present disclosure provides a simple one-step method for preparing a layered double hydroxide (LDH)-biochar composite material by carrying out a series of improvements on pretreatment, medicine use and the like. A material precursor magnesium-iron LDH-biomass prepared by the method is aged in a shorter time to obtain an LDH with a higher yield and crystallinity, pyrolysis is carried out at a certain temperature to obtain a magnetic magnesium-iron LDH-biochar composite material, the material contains magnesium-iron LDH particles on a surface, an LDH layered structure can be reconstructed after phosphate in water is adsorbed, and a recovery rate can 98% or more using a strong magnet. Based on characteristics of insolubility and complete ionization of $Mg(OH)_2$ in an aqueous solution, the method realizes controllable coprecipitation and pH control, and does not need to carry out long-time crystallization and pH control.

The present disclosure is specifically realized by the following technical solutions.

A one-step method for preparing a magnetic magnesium-iron LDH-biochar composite material includes the following steps:

1) drying and pulverizing biomass as a base material for loading LDH;
2) preparing a ferric salt solution at a concentration of a ferric salt of 0.2 M–1 M; and adding the biomass obtained in step 1), ultrasonically treating same, slowly adding magnesium hydroxide and stirring same continuously during the adding until an obtained mixture has a uniform color and is in the form of a slurry, and putting the slurry into an oven for standing and aging to obtain an aged slurry;
3) centrifuging the slurry obtained in step 2) and drying a solid matter after the centrifugation to prepare the magnesium-iron LDH-biomass precursor material; and
4) pyrolyzing the magnesium-iron LDH-biomass precursor material obtained in step 3) in an inert gas atmosphere to obtain the magnetic magnesium-iron LDH-biochar composite material.

Furthermore, the biomass is selected from corn stalk and the corn stalk is dried to a moisture content ≤5%; and the dried corn stalk is crushed to be capable of passing through a 20-40 mesh sieve.

Furthermore, in step 2), the ferric salt is one or more of $FeCl_3$, $Fe(NO_3)_3$, and $Fe_2(SO_4)_3$.

Furthermore, in step 2), the magnesium hydroxide and the ferric salt have a molar ratio of (2-4):1.

Furthermore, in step 2), the aging is performed at 60±10° C. for 2-4 h.

Furthermore, in step 2), an adding amount of the biomass and the ferric salt solution is that 5-10 g of the biomass is added into every 100 ml of the ferric salt solution.

Furthermore, in step 3), the drying is performed in an oven at a temperature of 50±5° C.

Furthermore, in step 4), the pyrolyzing is performed in the inert gas of nitrogen and at a temperature of 500±200° C. for 2±0.5 h.

Use of the composite material prepared by any of the above methods in phosphate adsorption in water treatment is provided.

The adsorbing material is recycled by the following steps: performing solid-liquid separation and recovery on the adsorbing material in wastewater within 5 s using a strong magnet.

The present disclosure utilizes characteristics of insolubility and complete ionization of $Mg(OH)_2$ in an aqueous solution, a magnetic magnesium-iron LDH-biochar is prepared in one step, and the preparation is simple and convenient, and has a wide raw material source and a low cost; and the prepared material is composed of biochar embedded (wrapped) by magnesium-iron LDH and a magnesium-iron oxide, the attached magnesium-iron LDH and magnesium-iron oxide can effectively remove phosphorus in an aqueous solution, and the magnetic material is easy to separate and recycle.

DESCRIPTION OF THE EMBODIMENTS

Example 1

Figure 1:
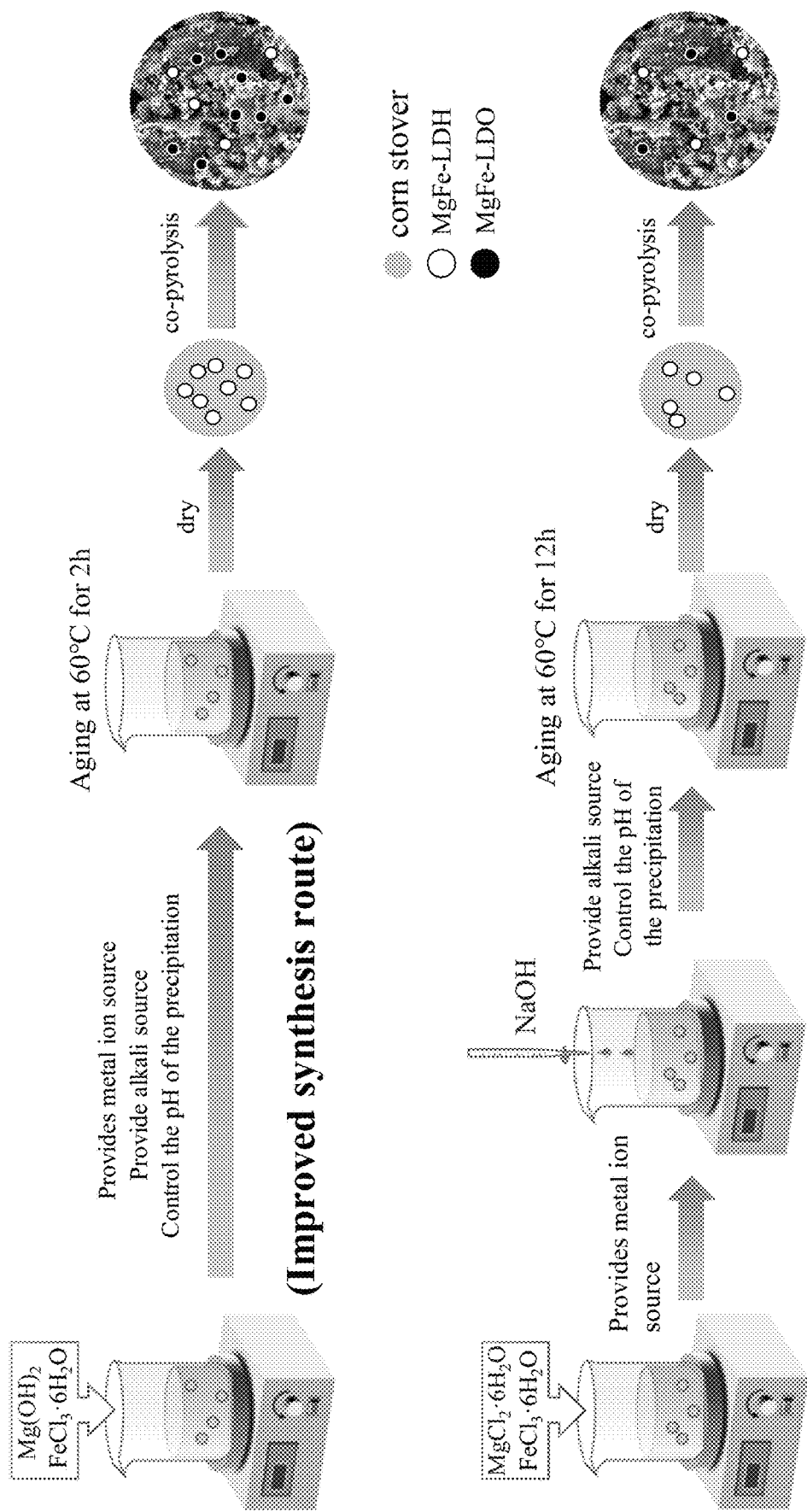
FIG. 1 shows a comparison of technology roadmaps of a preparation method of the present invention and a preparation of traditional magnesium-iron LDH-biomass composite material.

A magnetic magnesium-iron LDH-biochar composite material was prepared in one step: a specific preparation route was compared with a traditional preparation route shown in FIG. 1:
1) corn stalk is dried to a moisture content ≤5% and the dried corn stalk is crushed to be capable of passing through a 20 mesh sieve as a biomass;
2) 27.05 g (0.25 mol) of $FeCl_3 \cdot 6H_2O$ was weighed into a 250-ml beaker, 100 ml of deionized water was added, ultrasonic treatment was performed to completely dissolve the $FeCl_3 \cdot 6H_2O$, a completely dissolved ferric salt solution was added into a 500-ml volumetric flask with water to a constant volume, and thus a 0.5 mol/L ferric salt solution was prepared;
3) the ferric salt solution prepared in step 2) was added into a 1-L beaker containing 50 g of the biomass, stirring was performed continuously during the adding, the solution was ultrasonically treated for 30 min, 29 g (0.5 mol) of $Mg(OH)_2$ was finally slowly added with a molar ratio of magnesium to iron being 2:1, stirring was performed continuously during the adding until the whole solution was a slurry with a uniform color, and the beaker containing the solution was placed in an oven at 60° C. for aging for 2 h; and
4) a product obtained in step 3) was centrifuged and dries in an oven at 50° C. for 12 h to obtain a dried solid; and the dried solid was pyrolyzed at 500° C. for 2 h under a nitrogen atmosphere to obtain an LDH biochar-loaded composite material.

Figure 3:
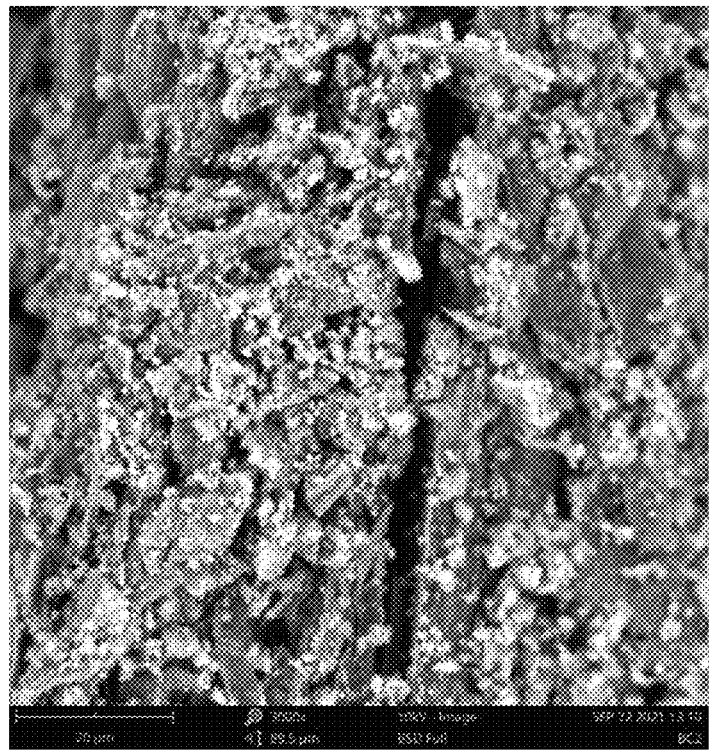
FIG. 3 is a scanning electron microscope image of the magnetic magnesium-iron LDH-biochar composite material prepared in example 1.
Figure 4:
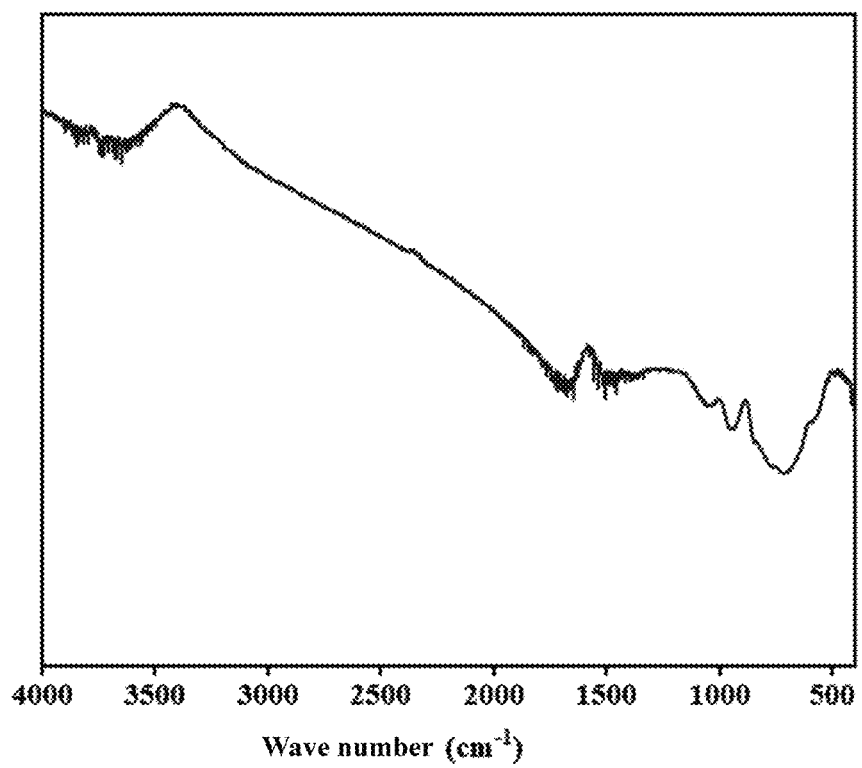
FIG. 4 is an FT-IR spectrogram of the magnetic magnesium-iron LDH-biochar composite material prepared in example 1.
Figure 5:
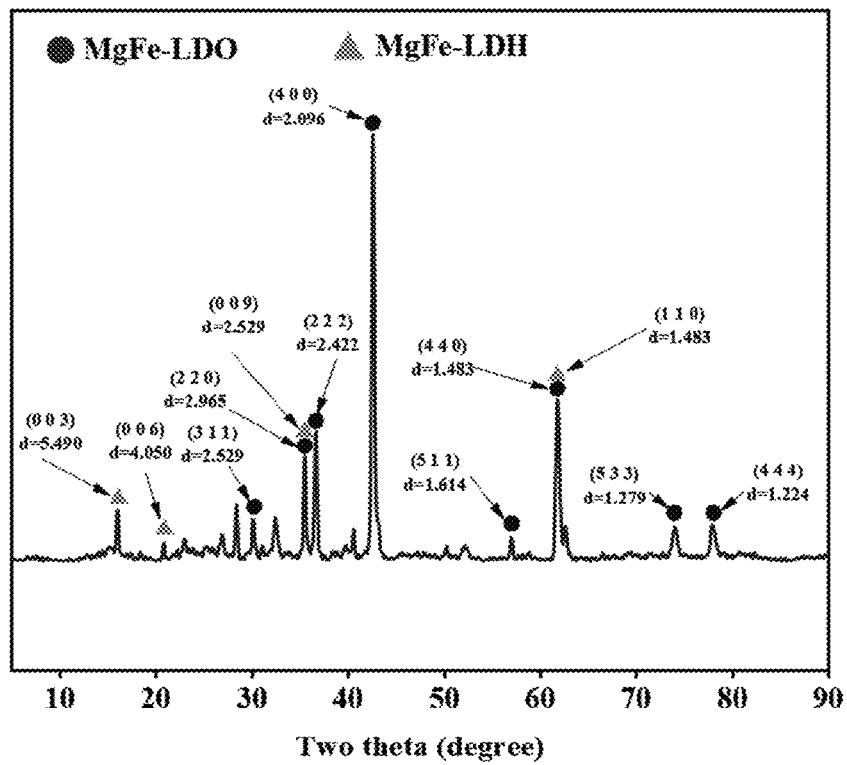
FIG. 5 is an XRD pattern of the magnetic magnesium-iron LDH-biochar composite material prepared in example 1.

A scanning electron microscope image of the magnetic magnesium-iron LDH-biochar composite material prepared in the example was shown in FIG. 3, an FT-IR spectrogram was shown in FIG. 4 and an XRD pattern was shown in FIG. 5.

Figure 2:
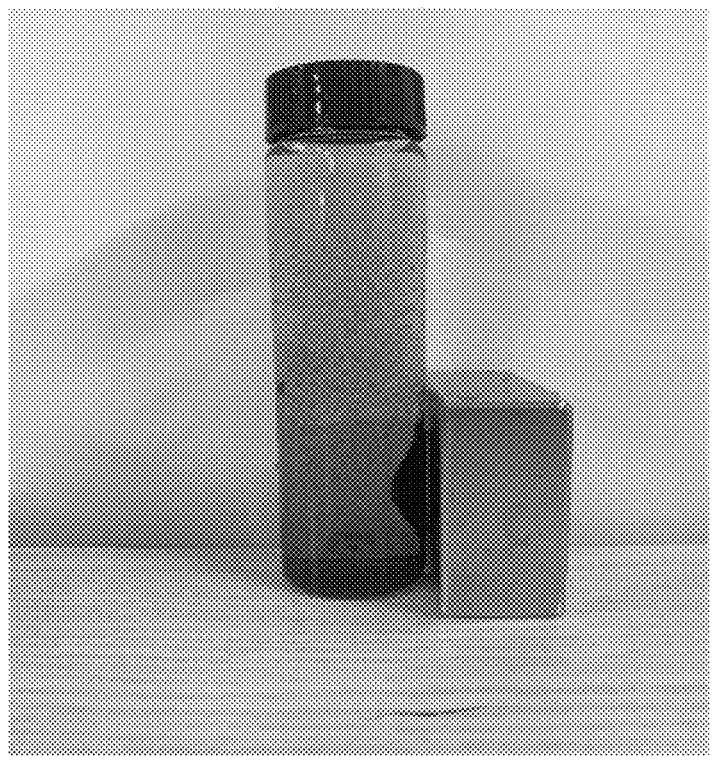
FIG. 2 shows a separation of a magnetic magnesium-iron LDH-biochar composite material after adsorption using a magnet.

The LDH-biochar composite material was proved to be magnetic by using a strong magnet for recovery in an aqueous solution. A recovery effect was shown in FIG. 2.

An adsorption test of removing phosphate radicals in water using the magnetic magnesium-iron LDH-biochar composite material prepared by the method of the present example was specifically as follows:

Preparation of stock solution: 1,000 mg/L of a $PO_4^{3-}$ solution: 1.4315 g of $KH_2PO_4$ was weighed and dissolved in 1 L of deionized water to prepare the solution.

Preparation of adsorption solution: the $PO_4^{3-}$ stock solution was diluted with deionized water to prepare an adsorption solution of a corresponding concentration.

0.04 g of the magnetic magnesium-iron LDH-biochar composite material was weighed and placed in a 50-ml centrifuge tube, 40 ml of the $PO_4^{3-}$ solution with concentrations of 50/100/200 mg/L was separately added, shaking and adsorption were performed at 25° C. and 200 rpm for 24 h, a supernatant was extracted and filtered with a 45-μm microporous membrane, a concentration of phosphate radicals in the supernatant was determined by ultraviolet spectrophotometry, and the adsorption capacity and a removal rate were calculated.

The concentration of phosphate radicals in the solution was determined by a national standard method of ascorbic acid-molybdenum blue colorimetry, and ascorbic acid-molybdate was used as a color developer to generate a blue compound which was determined by an ultraviolet spectrophotometer at a wavelength of 700 nm.

Example 2

"67.625 g (0.25 mol) $FeCl_3 \cdot 6H_2O$ was weighed" and "29 g (0.5 mol) of $Mg(OH)_2$ was finally slowly added" in step 2) of example 1, and "pyrolyzed at 500° C. for 2 h under a nitrogen atmosphere" in step 4) were separately modified to observe an effect of different modifications on removing phosphorus from the magnetic magnesium-iron LDH-biochar composite material. The modifications were shown in Table 1.

TABLE 1

| Modifications | Adding amount of $FeCl_3 \cdot 6H_2O$ | Adding amount of $Mg(OH)_2$ | Pyrolysis temperature |
|---|---|---|---|
| Examples 2-1 | 67.63 g (0.25 mol) | 29 g (0.5 mol) | 400° C. |
| Examples 2-2 | 27.05 g (0.1 mol) | 11.6 g (0.2 mol) | 500° C. |
| Examples 2-3 | 108.2 g (0.4 mol) | 46.4 g (0.8 mol) | 500° C. |
| Examples 2-4 | 67.63 g (0.25 mol) | 43.5 g (0.75 mol) | 500° C. |
| Examples 2-5 | 67.63 g (0.25 mol) | 58 g (1 mol) | 500° C. |

An experiment was carried out under the method and conditions in example 1, and the adsorption test was carried out on the $PO_4^{3-}$ solution of 50-200 mg/L. The obtained results were shown in Table 2.

TABLE 2

| | Concentrations | Removal rate | Adsorption capacity |
|---|---|---|---|
| Example 1 | 50 mg/L | 97.36% | 48.68 mg/g |
| | 100 mg/L | 91.32% | 91.32 mg/g |
| | 200 mg/L | 75.36% | 150.72 mg/g |
| Examples 2-1 | 50 mg/L | 97.32% | 48.66 mg/g |
| | 100 mg/L | 81.29% | 81.29 mg/g |
| | 200 mg/L | 52.42% | 104.84 mg/g |
| Examples 2-2 | 50 mg/L | 99.67% | 49.84 mg/g |
| | 100 mg/L | 64.51% | 64.51 mg/g |
| | 200 mg/L | 47.22% | 94.44 mg/g |
| Examples 2-3 | 50 mg/L | 99.26% | 49.63 mg/g |
| | 100 mg/L | 94.27% | 94.27 mg/g |
| | 200 mg/L | 89.23% | 178.46 mg/g |
| Examples 2-4 | 50 mg/L | 98.68% | 49.34 mg/g |
| | 100 mg/L | 87.11% | 87.11 mg/g |
| | 200 mg/L | 65.85% | 131.70 mg/g |
| Examples 2-5 | 50 mg/L | 95.84% | 47.92 mg/g |
| | 100 mg/L | 99.23% | 99.23 mg/g |
| | 200 mg/L | 84.72% | 169.44 mg/g |

Comparative Example 1

The magnesium hydroxide in step 2) of example 1 was replaced with magnesium chloride, and the remaining was the same as in example 1.

Comparative Example 2

Magnesium-aluminum LDH-biochar composite material Preparation method: sodium hydroxide (NaOH) was added into magnesium nitrate hexahydrate ($Mg(NO_3)_2 \cdot 6H_2O$) and aluminum nitrate nonahydrate ($Al(NO_3)_3 \cdot 9H_2O$) at a molar ratio of 2:1, magnesium-aluminum LDH was generated on a surface of rice hull powder by coprecipitation and co-pyrolysis was performed at 500° C. for 2 h.

0.1 g of the magnesium-aluminum LDH-biochar composite material was placed in a 100-ml conical flask, and 80 ml of a phosphate solution with a concentration of 50-100 mg/L was added to conduct an adsorption test.

Comparative Example 3

Iron-magnesium LDH material Preparation method: the iron-magnesium LDH material was prepared by adding sodium hydroxide (NaOH) to a solution of magnesium chloride hexahydrate ($MgCl_2 \cdot 6H_2O$) and ferric chloride ($FeCl_3$) at a molar ratio of 2:1 for precipitation.

0.025 g of the material obtained in example 1 and 0.025 g of the material obtained in comparative examples 1-3 were separately taken and placed in a 50-ml conical tube, 25 ml of a phosphate solution (pH=7.4) with a concentration of 50 mg/L was added into each conical tube, and an adsorption test was performed under the same condition. The test results were shown in Table 3.

TABLE 3

| | Concentrations | Removal rate | Adsorption capacity |
|---|---|---|---|
| Example 1 | 50 mg/L | 97.36% | 48.68 mg/g |
| Comparative example 1 | 50 mg/L | 88.06% | 44.03 mg/g |
| Comparative example 2 | 50 mg/L | 67.18% | 26.87 mg/g |
| Comparative example 3 | 50 mg/L | 73.00% | 36.50 mg/g |

It can be seen from Table 3 that the magnetic magnesium-iron LDH-biochar composite material prepared by the innovative synthesis method of the present disclosure had the highest removal rate and adsorption capacity of phosphorus in a phosphate solution with a concentration of 50 mg/L.

What is claimed is:

1. A method for preparing a magnetic magnesium-iron layered double hydroxide (LDH)-biochar composite material, wherein magnesium hydroxide is added into a ferric salt solution containing biomass to prepare a magnesium-iron LDH-biomass precursor material, the magnetic magnesium-iron LDH-biochar composite material is obtained after pyrolysis, and the method comprises the following steps:
   1) drying and pulverizing the biomass as a base material for loading LDH;
   2) preparing the ferric salt solution at a concentration of a ferric salt of 0.2 M–1 M; and adding the biomass obtained in step 1), ultrasonically treating the ferric salt solution containing the biomass, adding the magnesium hydroxide and stirring continuously during the adding until an obtained mixture has a uniform color and is in the form of a slurry, and putting the slurry into an oven for standing and aging to obtain an aged slurry;
   3) Centrifuging the aged slurry obtained in step 2) and drying a solid matter after the centrifugation to prepare the magnesium-iron LDH-biomass precursor material; and
   4) pyrolyzing the magnesium-iron LDH-biomass precursor material obtained in step 3) in an inert gas atmosphere to obtain the magnetic magnesium-iron LDH-biochar composite material,
   wherein in step 2), the magnesium hydroxide and the ferric salt have a molar ratio of (2-4):1.

2. The method for preparing a magnetic magnesium-iron LDH-biochar composite material according to claim 1, wherein the biomass is selected from corn stalk and the corn stalk is dried to a dried corn stalk with a moisture content ≤5%; and the dried corn stalk is crushed to be capable of passing through a 20-40 mesh sieve.

3. The method for preparing a magnetic magnesium-iron LDH-biochar composite material according to claim 1, wherein in step 2), the ferric salt is one or more of $FeCl_3$, $Fe(NO_3)_3$, and $Fe_2(SO_4)_3$.

4. The method for preparing a magnetic magnesium-iron LDH-biochar composite material according to claim 1, wherein in step 2), the aging is performed at 60±10° C. for 2-4 h.

5. The method for preparing a magnetic magnesium-iron LDH-biochar composite material according to claim 1, wherein in step 2), an adding amount of the biomass and the ferric salt solution is that 5-10 g of the biomass is added into every 100 ml of the ferric salt solution.

6. The method for preparing a magnetic magnesium-iron LDH-biochar composite material according to claim 1, wherein in step 3), the drying is performed in an oven at a temperature of 50±5° C.

7. The method for preparing a magnetic magnesium-iron LDH-biochar composite material according to claim 1, wherein in step 4), the pyrolyzing is performed in the inert gas of nitrogen and at a temperature of 500±200° C. for 2±0.5 h.

\* \* \* \* \*